Aug. 20, 1957   C. W. WARREN   2,803,752
APPARATUS FOR COMPENSATING RADIANT BEAMS
Filed Sept. 22, 1953
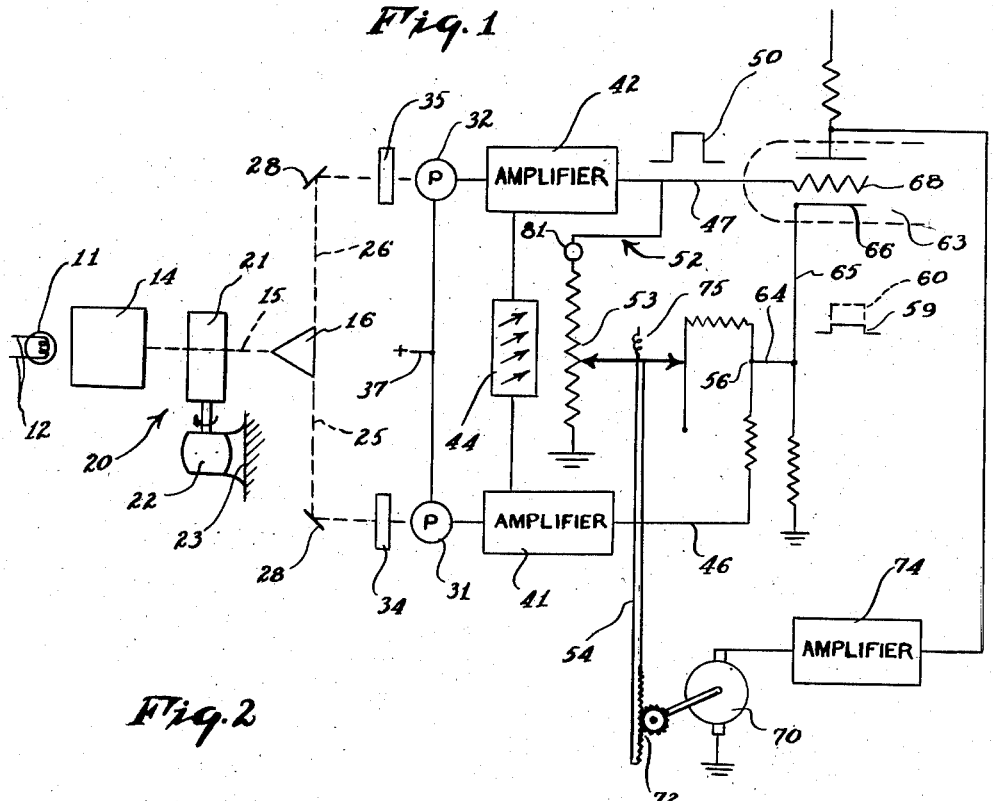
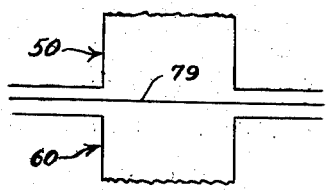
INVENTOR.
Charles W. Warren.
BY
ATTORNEYS United States Patent Office 2,803,752
Patented Aug. 20, 1957

2,803,752

APPARATUS FOR COMPENSATING RADIANT BEAMS

Charles W. Warren, North Plainfield, N. J., assignor to The Perkin-Elmer Corporation, Norwalk, Conn., a corporation of New York Application September 22, 1953, Serial No. 381,711

5 Claims. (Cl. 250—209)

This invention relates to apparatus for comparing the intensity of radiant beams such as light beams. The invention is more particularly concerned with apparatus in which light beams of equal intensity and wave length are passed through sample and reference cells and used to produce electric signals which are compared for the purpose of obtaining the light absorption quality of the material in the sample cell as compared with that in the reference cell.

It is an object of the invention to provide improved apparatus for comparing the intensity of light beams, or other beams of radiant energy. The invention will be described as applied to apparatus for comparing beams from a monochromator, but it will be understood that features of the invention can be used for comparing the intensity of any beams of radiant energy.

Another object of the invention is to provide apparatus which will operate satisfactorily with signals approaching a zero level. With equipment of the prior art, which attenuates a signal from the beam through the reference cell, to bring it down to the level of the signal from the beam through the sample cell, unsatisfactory results are obtained near the zero signal level because the signals approach the noise level of the circuits. In accordance with one feature of this invention, signals approaching zero can be measured without interference by noise in the circuit.

Another feature of the invention relates to apparatus for comparing light beams with signals generated by direct current. This is advantageous at low light levels because alternating current produces residual signals in the circuit as the result of capacitance of some parts of the circuit structure, such as the tube pins. These residual signals interfere with the operation of the circuit when the light levels are low and the detector signals produced by the light beams are weak as compared with the residual signals.

Another object of the invention is to provide apparatus for comparing the intensity of light beams by means of circuits having output signals in phase and connected so as to control the balancing of the circuits by means of an electronic tube.

Other objects, features and advantages of the invention will appear or be pointed out as the description proceeds.

In the drawing, forming a part hereof, in which like reference characters indicate corresponding parts in all the views:

Figure 1 is a diagrammatic view showing apparatus, made in accordance with this invention, for comparing the intensity of light beams from a monochromator which are passed through sample and reference cells; and Figure 2 is a diagram showing the way in which the signal outputs are algebraically added in the electronic tube.

Figure 1 shows an incandescent electric light 11 supplied with direct current from a power line 12. In front of the light 11, there is monochromator 14 which supplies a single color light beam 15 to a beam splitter 16. There is a chopper 20 located between the monochromator 14 and the beam splitter 16. This chopper 20 includes a rotating shield 21 on the end of a shaft of a motor 22 attached to a support 23. This apparatus is merely representative of choppers for repetitively shutting off the light to the beam splitter 16.

From the beam splitter 16, two equal light beams 25 and 26, of equal wave length, pass to reflectors 28, and from these reflectors to detectors 31 and 32. These detectors may be photo cells, or lead sulfide cells, or multiplier photo tubes, or temperature sensitive resistors, or any other type of detector which will give different signals in accordance with the intensity of the beams of light or other radiant energy which strikes them.

The light beam 25 passes through a sample cell 34 located in front of the detector 31. The material to be tested for its light absorption characteristic is placed in the sample cell 34. The light beam 26 passes through a cell 35 located in front of the detector 32. This cell 35 serves as the reference cell, and may contain air or any other pre-determined substance for which the light absorption characteristic is known and the signals from which are to be compared with those from the sample cell 34 containing the unknown material or the mixture of materials whose relative proportions are unknown.

The detectors 31 and 32 are supplied with direct current from a common power source 37. The signals from the detector 31 operate an amplifier 41; and the signals from the detector 32 operate an amplifier 42. There is a potentiometer system or ladder network 44 connecting the circuits of the amplifiers 41 and 42. This system is adjustable to balance the wave length sensitivity response of the detectors 31 and 32 when the system is to be used with light beams of another wave length. The adjustment can be effected automatically by a mechanical coupling between the monochromator and the ladder network. The detectors 31 and 32 and their circuits, including the amplifiers 41 and 42, are made as similar as possible so as to obtain more accurate comparison of the intensity of the light beams.

The output signals from the amplifier 41 are supplied to a conductor 46, and the output signals from the amplifier 42 are supplied to a conductor 47. The wave pulse in the conductor 47 is illustrated in the wave diagram designated by the reference character 50. The wave pulse from the amplifier 41, in the conductor 46, is similar to the wave pulse 50 in phase and form, but of less amplitude if the light absorption in the same cell 34 exceeds that in the reference cell 35, as is usually the case.

It is a feature of this invention to build up the weaker signal in the conductor 46 instead of attenuating the stronger signal in the conductor 47. This building up of the sample circuit signal is effected by a substitution or adding circuit 52 which includes a potentiometer 53, operated by a motion-transmitting connection 54.

The output from the potentiometer 53 is supplied to a terminal 56 to which the circuit 46 of the amplifier 41 is also connected. Since the output signals in the conductors 46 and 47 are in phase, the total signal strength at the terminal 56 is the sum of the sample circuit signal from the conductor 46 plus a signal from the conductor 47 in the reference circuit depending upon the setting of the potentiometer 53. The potentiometer 53 is constructed with sufficient variation in impedance to supply, to the terminal 56, a signal substantially equal to the signal 50, or a signal approaching zero intensity.

In the operation of the invention, the potentiometer 53 is adjusted so as to add to the signal from the sample signal circuit just enough to bring that signal up to the strength of the output signal 50 of the reference signal circuit. The signal in the conductor 46, without the added strength from the circuit 52, is shown in full lines and indicated by the reference character 59. With the added signal strength from the circuit 52, the signal at the terminal 56 is built up to the value indicated by the dotted line pulse 60.

Since the output signals from the circuits of conductors 46 and 47 are in phase, they can be used to control the operation of an electronic tube 63. In the circuit shown, the terminal 56 is connected through conductors 64 and 65 to the cathode 66 of the electronic tube 63. The conductor 47 of the reference signal circuit is connected with the grid 68 of the tube 63.

The adjustment of the potentiometer 53 is effected automatically by an electric motor 70. The motion-transmitting connections 54 from the potentiometer 53 include a rack and pinion connection 72 with the pinion connected to the armature shaft of the motor.

Power to operate the motor 70 is controlled by the tube 63 through an amplifier 74. When the voltage on the cathode 66 is lower than that of the grid 68, current is supplied to the amplifier 74 to rotate the motor 70 in a direction to adjust the potentiometer 53 so that the signal strength of the cathode circuit is increased. This continues until the voltage on the cathode 66 is equal to that on the grid 68, and when this condition is obtained, no further power is supplied to the motor 70.

The potentiometer 53 is preferably provided with a light bias in a direction to reduce the strength of signal which it adds to that of the sample signal circuit. This is illustrated diagrammatically as a spring 75. In the operation of the apparatus, the signal strength of the cathode tends to fall and is repetitively brought up to that of the grid by successive operation of the motor 70. If desired, the motor 70 can be provided with reversing coils which are connected in the circuits so as to move the potentiometer in a direction to decrease the signal strength if the cathode voltage ever exceeds that of the grid. Such a provision for reversing makes the bias of the potentiometer 53 unnecessary.

Figure 2 shows the way in which the invention operates to eliminate noise when the strength of the sample signal approaches zero. If the signal supplied by the amplifier 41 approaches zero, then the signal strength added by the potentiometer 53, at the terminal 56, is substantially the full potential of the signal pulse 50 of the reference signal circuit. Figure 2 shows the signal pulse 50 with noise represented by the wavy line of the pulse. The signal pulse 60 is shown as negative merely to illustrate the effect of these two signals when applied to the grid and cathode, respectively, of the tube 63.

With the signal from the sample circuit near the zero level, the signal 60 may be considered as made up entirely from energy supplied through the potentiometer 53. Therefore, the signal pulse 60 is substantially the same as the signal pulse 50 including the noise. The effect in the tube 63 is the same as though the signal pulses 50 and 60 were mirror images of one another which add together algebraically to produce a zero potential represented by the line 79 in Figure 2. It should be noted that the noise waves cancel one another in the same way as the main pulses cancel one another.

The comparative intensity of the light beams supplied to the detectors 31 and 32 is indicated by the current flowing through the meter 81. It can also be indicated by the adjustment of the potentiometer 53.

The preferred embodiment of the invention has been illustrated and described, but changes and modifications can be made, and some features of the invention can be used in different combinations, without departing from the invention as defined in the claims.

I claim as my invention:

1. Apparatus for comparing the intensity of light beams including, in combination, a source of light of pre-determined color, a beam splitter that divides the light into two separate beams, a chopper that repetitively interrupts the light beam, two light intensity detectors, one of which receives light from one of the beams and the other of which receives light from the other of said beams, an amplifier in the output circuit of each detector, output circuits for the amplifiers to which signals are supplied by the amplifiers with the output signal of each amplifier in phase with that of the other amplifier, and an addition circuit leading from the output of one amplifier to the output circuit of the other amplifier to increase the strength of the signals in the circuit of said other amplifier, a controller that determines the amount of signal strength flowing from one amplifier circuit to the other, and a regulator responsive to the differences in the signal strengths of the respective amplifier output circuits for adjusting the controller to obtain equal signal strength in both circuits.

2. Apparatus for comparing the intensity of light beams, said apparatus comprising a source of light of pre-determined color, a chopper that includes a shutter for periodically interrupting the light, two light-sensitive detectors that receive light from said source, means for passing the light to one detector through a sample to be tested, an amplifier for the output signals from one of the detectors, another amplifier for the output signals from the other detector and an addition circuit through which signals from one amplifier are supplied to the circuit of the other amplifier in which the signal strength is weaker, and means for adjusting the circuit to balance the signals.

3. The apparatus described in claim 2 characterized by direct current amplifiers producing output signals in phase with one another, and further characterized by an adjustable controller in the addition circuit with a motor for moving the adjustable controller, and with power supply means for the motor responsive to differences in the signal strength of the respective circuits.

4. Apparatus for comparing the intensity of radiant energy beams including two energy intensity detectors, amplifiers for the output signals from the detectors, an addition circuit through which the amplifier with the stronger signal supplies energy to build up the signal strength in the output circuit of the other amplifier, a controller in the addition circuit adjustable to determine the extent of signal build-up, and a regulator responsive to the comparative strength of the signals for operating the controller.

5. Apparatus for comparing the intensity of radiant energy beams including a source of radiant energy of pre-determined wave length, a mechanical chopper including a rotating shutter in the path of the beam, a beam splitter that divides the beam into two beams of equal intensity and wave length, a sample cell in the path of one beam, a reference cell in the path of the other beam, a radiant energy intensity detector beyond each of the cells, means for supplying direct current to the energy intensity detectors, direct current amplifiers to which signals are supplied by the detectors, output circuits for the amplifiers in which signals from the amplifiers are in phase with one another, and an addition circuit from the reference signal amplifier for building up the signal of the sample signal amplifier to the same level as that of the reference signal amplifier, an adjustable controller for determining the amount of build-up provided by the addition circuit, an electric motor connected to the adjustable controller for moving it to each adjustment, and means for controlling the supply of power to the motor, including an electronic tube having its grid connected to the reference signal circuit and its cathode connected to the sample signal circuit and supplied with power by the built-up signal of the sample signal circuit.

References Cited in the file of this patent

UNITED STATES PATENTS

| | | |
|---|---|---|
| 1,915,385 | Replogle | June 27, 1933 |
| 2,145,591 | FitzGerald | Jan. 31, 1939 |
| 2,159,181 | Ryder | May 23, 1939 |
| 2,184,743 | Horton | Dec. 26, 1939 |